Jan. 15, 1963
G. SIEBOL
3,073,205
BLIND RIVET ASSEMBLY HAVING MANDREL WITH A DEFORMABLE SKIRT PORTION
Filed Dec. 16, 1958
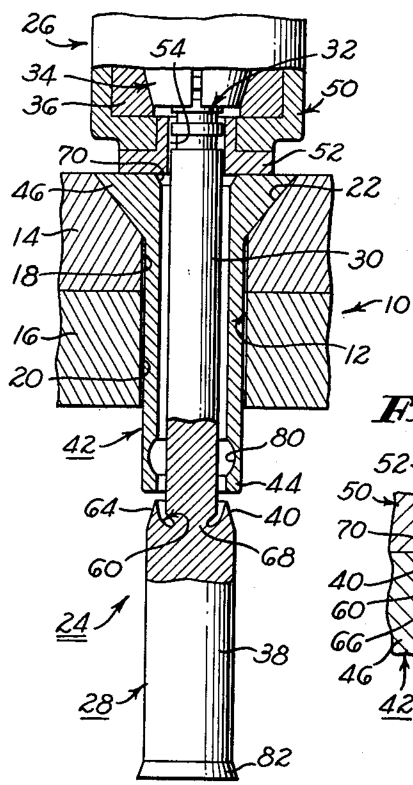
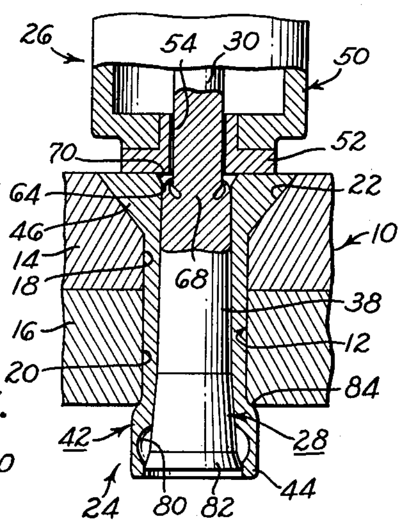
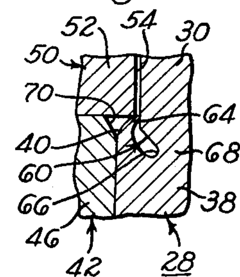
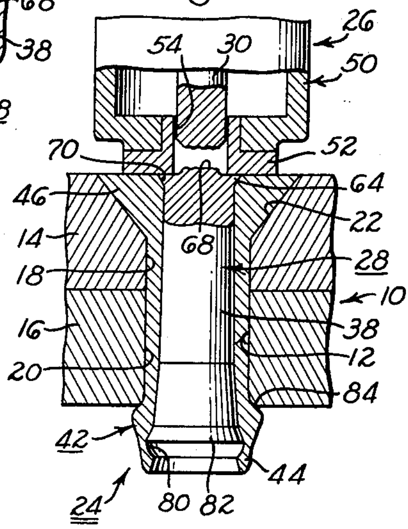
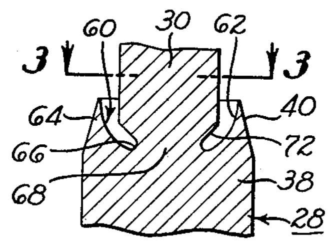
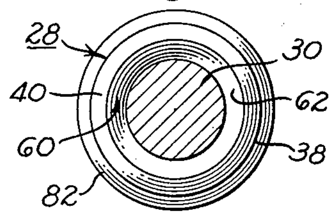
INVENTOR.
GEORGE SIEBOL
BY HIS ATTORNEYS.
HARRIS, KIECH, RUSSELL & KERN United States Patent Office 3,073,205
Patented Jan. 15, 1963

3,073,205
BLIND RIVET ASSEMBLY HAVING MANDREL WITH A DEFORMABLE SKIRT PORTION

George Siebol, Anaheim, Calif., assignor to Olympic Screw & Rivet Corporation, Downey, Calif., a corporation of California Filed Dec. 16, 1958, Ser. No. 780,721
2 Claims. (Cl. 85—40)

The present invention relates in general to rivets and, more particularly, to a blind rivet or blind rivet assembly, such an assembly being set by applying riveting forces thereto from one side of the work only, whereby the assembly may be set in inaccessible locations wherein it is difficult or impossible to apply riveting forces from both sides of the work.

As background, the invention contemplates a blind rivet assembly which includes a pin having a substantially cylindrical stem adjacent one end thereof and a substantially cylindrical shank adjacent the other end thereof, the shank having a diameter greater than that of the stem and being connected to the stem by a tapered annular shoulder which converges toward the stem end of the pin. The rivet assembly also includes a tubular rivet on the stem having at one end a tail located adjacent the tapered annular shoulder on the pin and having a head at its other end. To set such a rivet assembly, a riveting tool is utilized which has a pressure member engageable with the head of the rivet and which has a pulling member movable axially of the pressure member and engageable with a grippable means on the stem of the pin. With the rivet assembly projecting through the work toward the blind side thereof and with the head on the rivet seated against the work, the riveting tool is actuated to move the pulling member axially of the pressure member. Such movement of the pulling member results in axial movement of the pin relative to the rivet, movement of the latter being prevented by the pressure member. As the enlarged shank of the pin is drawn into the rivet, the latter is expanded radially into engagement with the work and the tail thereof is flared so that the rivet is locked in place against axial movement. The pin is provided with a weakened zone, or break neck, which snaps, in response to the force applied by the pulling member, when the rivet assembly is set.

A primary object of the present invention is to provide a blind rivet assembly of the foregoing type wherein the tapered annular shoulder on the pin is provided therein with an annular recess having an open end which faces axially of the pin toward the stem end thereof and having an outer wall which cooperates with the surface of the tapered shoulder to provide the pin with a tapered annular skirt converging toward the stem end of the pin, and wherein the head of the rivet is provided therein with an inwardly facing annular cavity to receive such skirt when the rivet assembly is set.

When setting the foregoing rivet assembly of the invention, the skirt mentioned is at least partially collapsed against the stem of the pin as the shank is drawn into and through the rivet. However, when the skirt reaches the head end of the rivet, it engages the pressure member and the material of the skirt is displaced radially outwardly to fill the cavity in the head of the rivet, thereby locking the shank of the pin against axial movement relative to the rivet in one direction.

Another important object of the invention is to provide a pin wherein the inside diameter of the open end of the recess in the tapered shoulder is substantially equal to that of the stem, but wherein the recess has an inside diameter less than that of the stem in a zone spaced axially from the open end of the recess, and adjacent the bottom of the recess, to provide the pin with a break neck in such zone.

With the foregoing construction, the pin breaks, upon setting of the rivet assembly, at a point substantially flush with the head end of the rivet.

Another important object of the invention is to provide an annular enlargement on the shank which fits into an inwardly facing annular groove in the tail of the rivet when the assembly is set to hold the pin against axial movement relative to the rivet in cooperation with the skirt hereinbefore discussed. Thus, when the rivet assembly is set, the portion of the pin remaining in the tubular rivet is firmly locked in place.

The foregoing objects, advantages, features and results of the present invention, together with various other objects, advantages, features and results thereof which will be evident to those skilled in the art in the light of this disclosure, may be attained with the exemplary embodiment of the invention described in detail hereinafter and illustrated in the accompanying drawing, in which:

FIG. 1 is a longitudinal sectional view of a blind rivet assembly of the invention showing the assembly prior to setting thereof;

FIG. 2 is an enlarged, fragmentary sectional view of a portion of a pin of the rivet assembly;

FIG. 3 is a transverse sectional view taken along the arrowed line 3—3 of FIG. 2;

FIG. 4 is a view similar to FIG. 1, but showing the rivet assembly in a partially set condition;

FIG. 5 is an enlarged, fragmentary sectional view duplicating a portion of FIG. 4; and FIG. 6 is a longitudinal sectional view similar to FIGS. 1 and 4, but showing the rivet assembly in fully set condition.

In the drawing, the work to be riveted is designated generally by the numeral 10 and is provided with a hole 12 therethrough. Actually, the hole 12 is formed by aligned holes in two or more elements. In the particular showing presented in the drawing, the work 10 comprises elements 14 and 16 respectively having aligned holes 18 and 20 which, together, form the generally-designated hole 12. Also, the element 14 is provided with a countersink 22 to provide a flush construction, although this is not essential to the invention.

Shown disposed in the hole 12 and extending through the work 10 is a blind rivet assembly 24 of the invention which is settable by a riveting tool 26. The rivet assembly 24 includes a pin 28 having adjacent one end thereof a substantially cylindrical stem 30 provided with grippable means 32 engageable by a gripping means 34 on an axially movable pulling member 36 of the riveting tool 26. Adjacent the other end of the pin 28 is an enlarged, substantially cylindrical shank 38 having a diameter greater than that of the stem 30, there being a tapered annular shoulder 40 at the junction of the shank and the stem which converges toward the stem end of the pin 28.

The rivet assembly 24 also includes a tubular rivet 42 which is normally disposed on the stem 30 of the pin 28 and which has a tail 44 adjacent the shoulder 40 and a head 46 adjacent the grippable means 32.

The riveting tool 26 includes a pressure member 50 relative to which the pulling member 36 is axially movable, the pressure member 50 having a die 52 adapted to seat on the head 46 of the rivet 42 to prevent axial movement of the rivet relative to the work 10 in response to axial movement of the pin 28 relative to the rivet induced by the pulling member 36. The die 52 is provided therethrough with an aperture 54 of a fixed diameter greater than the diameter of the stem 30, but less than the diameter of the shank 38.

The riveting tool 26 described above is conventional and the blind rivet assembly 24, as thus far described, is also known. The novel features of the rivet assembly 24 will now be considered.

The tapered annular shoulder 40 on the pin 28 is provided therein with an annular recess 60 having an open end which faces axially of the pin toward the stem end thereof, this recess having an outer wall 62 which cooperates with the surface of the shoulder 40 to provide the pin with a tapered annular skirt 64 converging toward the stem end of the pin. The inside diameter of the open end of the recess 60 is substantially equal to that of the stem 30, but the recess is provided with an inside diameter less than that of the stem in a zone 66 spaced axially from the open end of the recess toward the shank end of the pin. In other words, the stem 30 is undercut in the annular zone 66 to provide a break neck 68 at which the pin 28 will snap after the blind rivet assembly 24 is set, as hereinafter described.

The tapered skirt 64, upon setting of the rivet assembly 24, is deformed radially outwardly into an inwardly facing annular cavity 70 in the head 46 of the rivet 42, as will be described hereinafter, to lock the shank 38 of the pin 28 and the rivet 42 together against relative axial movement in one direction.

Considering setting of the blind rivet assembly 24, as will be seen by comparing FIGS. 1, 4 and 6 of the drawing in sequence, the rivet assembly initially has a loose fit in the hole 12. However, as the tapered shoulder 40 of the pin 28 is drawn into the tubular rivet 42 by the pulling member 36, the rivet is expanded into engagement with the periphery of the hole 12, due to the fact that the inside diameter of the rivet is less than the diameter of the shank 38. The inside diameter of the tail 44 of the rivet is at least equal to that of the free or forward end of the tapered skirt 64 so that the latter can enter the interior of the rivet 42.

Referring to FIGS. 4 and 5, as the shank 38 of the pin 28 is drawn into and through the tubular rivet 42, the tapered skirt 64 is at least partially collapsed inwardly toward the stem 30 of the pin. Ultimately, the collapsed skirt 64 engages the die 52 and the material forming the skirt is deformed radially outwardly, as shown in FIG. 6, to completely fill the inwardly facing annular cavity 70 in the head 46 of the rivet. This securely locks the shank 38 of the pin 28 against axial movement relative to the rivet 42 in one direction.

Once the cavity 70 has been completely filled with the material forming the skirt 64, the increased resistance to movement of the pin 28 in response to movement of the pulling member 36 results in snapping of the pin at the break neck 68, as shown in FIG. 6. Since the break neck 68 is at the bottom of the recess 60, i.e., at the shank end of such recess, the pin 28 snaps off substantially flush with the head end of the rivet 42, leaving very little excess to be removed by grinding, or otherwise, which is an important feature.

It will be apparent from the foregoing that the tapered skirt 64, even though it collapses at least partially, serves as a means for initiating expansion of the tubular rivet 42 into engagement with the wall of the hole 12 as the skirt progresses through the rivet. Then, when the skirt 64 has been completely pulled through the rivet, it is deformed radially outwardly by the die 52 to fill the cavity 70 in the head 46 of the rivet 42, thereby locking the shank 38 and the rivet 42 together. The volume of the tapered skirt 64 is equal to that of the cavity 70 so that the skirt just fills the cavity.

Satisfactory results have been achieved with a taper angle for the annular shoulder 40, relative to the axis of the pin 28, of the order of 15°, and with an angle for the inner wall 72 of the undercut portion of the annular recess 60, again relative to the axis of the pin 28, of the order of 45°.

The tail 44 of the tubular rivet 42 is provided therein with a relatively wide, inwardly facing, annular groove 80 which receives an annular enlargement 82 on the shank 38 when the rivet assembly 24 is set, as shown in FIG. 6, the enlargement 82 being located adjacent the blind end of the shank. As the enlargement 82 is drawn into the tail 44 of the rivet 42, as shown in FIG. 4, it expands the tail to the diameter of the enlargement. However, when the enlargement 82 enters the groove 80, the hoop stress in the tail 44 on the blind side of the groove 80 causes the tail to contract to some extent in this region so that the enlargement 82 is firmly locked in the groove 80. Also, the enlargement 82 engages the side of the groove 80 nearest the work 10 to positively preclude any further movement of the shank 38 in a direction away from the blind side of the work. Thus, it will be apparent that the enlargement 82, the groove 80, the skirt 64 and the cavity 70 cooperate to positively preclude axial movement of the shank 38 relative to the rivet 42 after the rivet assembly 24 is set.

It will be noted from FIG. 4 in particular that the shank 38 itself expands the tail 44 of the rivet 42 sufficiently to form on the rivet 42 a shoulder 84 which engages the blind side of the work 10 to lock the rivet 42 in place relative to the work in cooperation with the head 46 on the rivet. When the annular enlargement 82 seats on the side of the groove 80 in the tail 44 which is nearest the work 10, it tends to make the shoulder 84 more pronounced and thus to more securely lock the rivet 42 in place.

While the discussion thus far has primarily regarded the rivet 42 as the deformable element of the rivet assembly 24, it will be understood that the shank 38 also deforms to some extent in the process of setting the assembly. In other words, the shank 38 is subject to some wire drawing, as represented by the tapering thereof shown in FIGS. 4 and 6 of the drawing.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a blind rivet assembly, the combination of: a pin having a stem adjacent one end thereof and a shank adjacent the other end thereof, said shank having a diameter greater than that of said stem, said pin having at the junction of said shank and said stem a tapered annular shoulder which converges toward said one end of said pin, said shoulder being provided therein with an annular recess having an open end which faces axially of said pin toward said one end thereof, said recess diverging toward said one end of said pin and having an outer wall which cooperates with said shoulder to provide said pin with a tapered annular skirt converging toward said one end of said pin, the inside diameter of said open end of said recess being substantially equal to the diameter of said stem, said recess having an inside diameter less than the diameter of said stem in a zone spaced axially from said open end of said recess toward said other end of said pin; and a tubular rivet on said stem and having at one end thereof a head adjacent said one end of said pin and at the other end thereof a tail adjacent said skirt, the inside diameter of said tail being less than the diameter of said shank, but at least equal to the diameter of the free end of said skirt, and said head having therein an inwardly facing annular cavity to receive said skirt when said assembly is set.

2. A pin for a blind rivet assembly having a substantially cylindrical stem adjacent one end thereof and a substantially cylindrical shank adjacent the other end thereof, said shank having a diameter greater than that of said stem, said pin having at the junction of said shank and said stem a tapered annular shoulder which converges toward said one end of said pin, said shoulder being provided therein with an annular recess having an open end which faces axially of said pin toward said one end thereof, said recess diverging toward said one end of said pin and having an outer wall which cooperates with said shoulder to provide said pin with a tapered annular skirt converging toward said one end of said pin, the inside diameter of said open end of said recess being substantially equal to the diameter of said stem, said recess having an inside diameter less than the diameter of said stem in a zone spaced axially from said open end of said recess toward said other end of said pin.

References Cited in the file of this patent

UNITED STATES PATENTS

| | | |
|---|---|---|
| 2,030,166 | Huck | Feb. 11, 1936 |
| 2,030,168 | Miller | Feb. 11, 1936 |
| 2,371,423 | Buchet | Mar. 13, 1945 |
| 2,531,270 | Hood | Nov. 21, 1950 |
| 2,765,699 | Torre | Oct. 9, 1956 |

FOREIGN PATENTS

| | | |
|---|---|---|
| 106,169 | Great Britain | May 17, 1917 |
| 596,275 | Great Britain | Dec. 31, 1947 |
| 768,850 | Great Britain | Feb. 20, 1957 |